United States Patent
Ogawa et al.

(10) Patent No.: US 7,182,381 B2
(45) Date of Patent: Feb. 27, 2007

(54) JOINT STRUCTURE FOR VEHICLE BODY MEMBERS

(75) Inventors: Shinichi Ogawa, Okazaki (JP);
 Yoshinobu Matsumura, Okazaki (JP);
 Kosaku Uchida, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 142 days.

(21) Appl. No.: 10/968,051

(22) Filed: Oct. 20, 2004

(65) Prior Publication Data

US 2005/0140158 A1    Jun. 30, 2005

(30) Foreign Application Priority Data

Oct. 20, 2003    (JP)    ............... 2003-358874

(51) Int. Cl.
 *B62D 27/00*    (2006.01)
(52) U.S. Cl. ........................... 296/29; 296/210
(58) Field of Classification Search ................. 296/210, 296/29
See application file for complete search history.

(56) References Cited

U.S. PATENT DOCUMENTS

2003/0122405 A1*  7/2003  Stallfort et al. ............. 296/210

FOREIGN PATENT DOCUMENTS

| JP | 5163474 | 6/1993 |
|----|---------|--------|
| JP | 5271640 | 10/1993 |
| JP | 2000272541 | 10/2000 |

\* cited by examiner

*Primary Examiner*—Joseph D. Pape
(74) *Attorney, Agent, or Firm*—Birch, Stewart, Kolasch & Birch, LLP

(57) ABSTRACT

To provide a joint structure for vehicle body members, which can effectively accommodate distortion due to joining of dissimilar metals, a joining surface of an aluminum roof panel and a joining surface of a side roof rail made of steel are joined by non-piercing rivets, with an electrically insulating structural adhesive being interposed between the joining surfaces, and a bead extending along the joining surfaces is formed in the aluminum roof panel.

16 Claims, 3 Drawing Sheets

JOINT STRUCTURE FOR VEHICLE BODY MEMBERS

CROSS REFERENCE TO RELATED APPLICATION

The entire disclosure of Japanese Patent Application No. 2003-358874 filed on Oct. 20, 2003, including specification, claims, drawings and summary, is incorporated herein by reference in its entirety.

BACKGROUND OF THE INVENTION

1. Field of the Invention

This invention relates to a joint structure for vehicle body members comprising dissimilar metals in a vehicle such as an automobile.

2. Description of the Related Art

In recent years, vehicle body members made of aluminum or an aluminum alloy (for example, aluminum roof panel) have been utilized for achieving weight reduction of a vehicle body in a vehicle such as an automobile. In joining a vehicle body member made of aluminum and a vehicle body member made of steel, metallurgical joining (melt bonding such as spot welding) is not employed, since aluminum and steel are dissimilar metals, and their physical properties, such as melting point and coefficient of linear expansion, are different. Instead, mechanical joining using a fastener, such as rivet or bolt, or a caulking material is put to use (see Japanese Patent Application Laid-Open No. 2000-272541).

The above-described joint structure for dissimilar metals, however, has encountered the following problem: During joining, such as mechanical joining, or during baking in a painting step, distortion at a site along the junction occurs in the vehicle body member having lower rigidity, such as the aluminum roof panel, owing to a difference in stress or in a physical property such as coefficient of linear expansion.

SUMMARY OF THE INVENTION

The present invention provides a joint structure for vehicle body members, which can effectively accommodate distortion due to the joining of dissimilar metals.

The joint structure for vehicle body members according to the present invention, designed to attain the above object, is a joint structure for vehicle body members, adapted to join a joining surface of a first vehicle body member, and a joining surface of a second vehicle body member, the second vehicle body member comprising a metal different from a metal making up the first vehicle body member, and comprising:

a bead formed in a main body portion of the vehicle body member having lower rigidity of the first vehicle body member and the second vehicle body member, the bead extending along the joining surfaces.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PRESENT INVENTION

A joint structure for vehicle body members according to the present invention will now be described in detail by an embodiment with reference to the accompanying drawings, but the invention is not limited by this embodiment.

Figure 1:
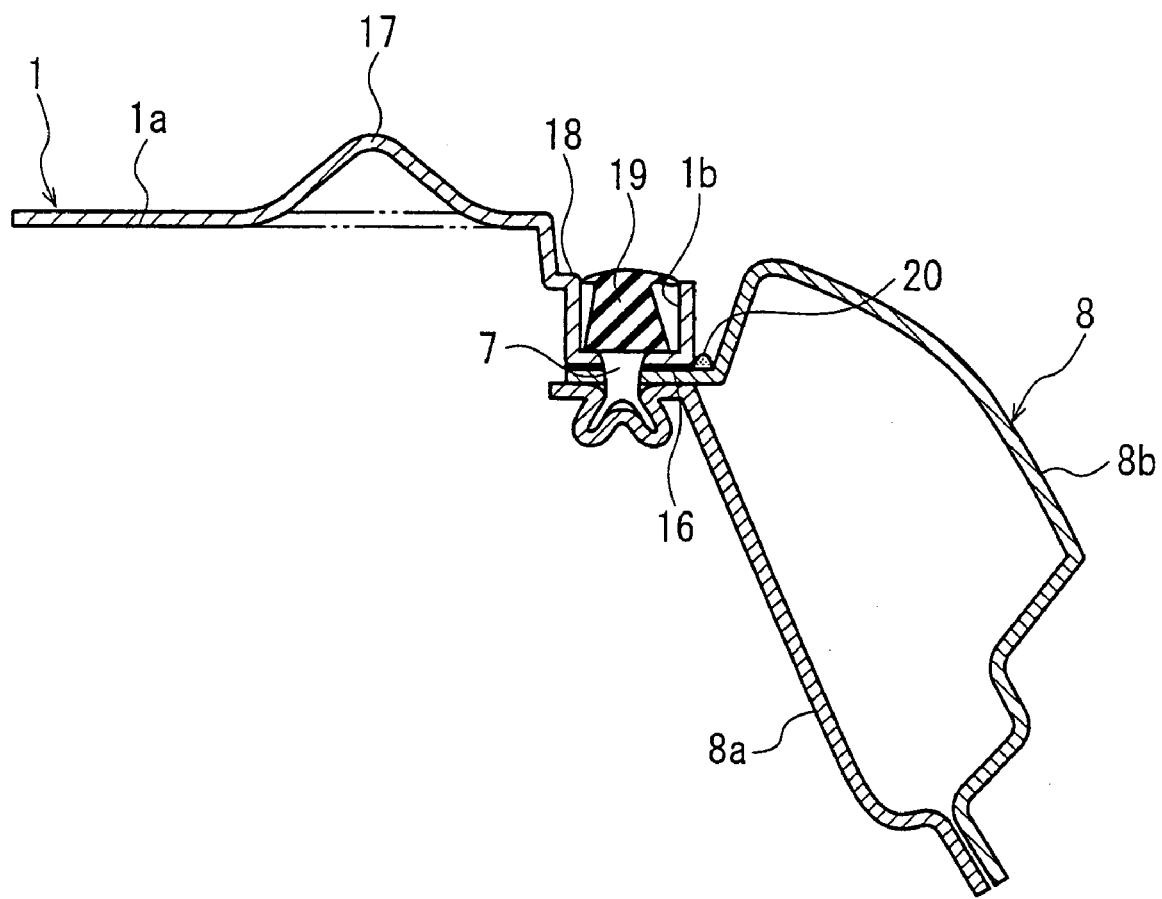
FIG. 1 is a sectional view of a junction between an aluminum roof panel and a side structure showing an embodiment of the present invention.
Figure 2:
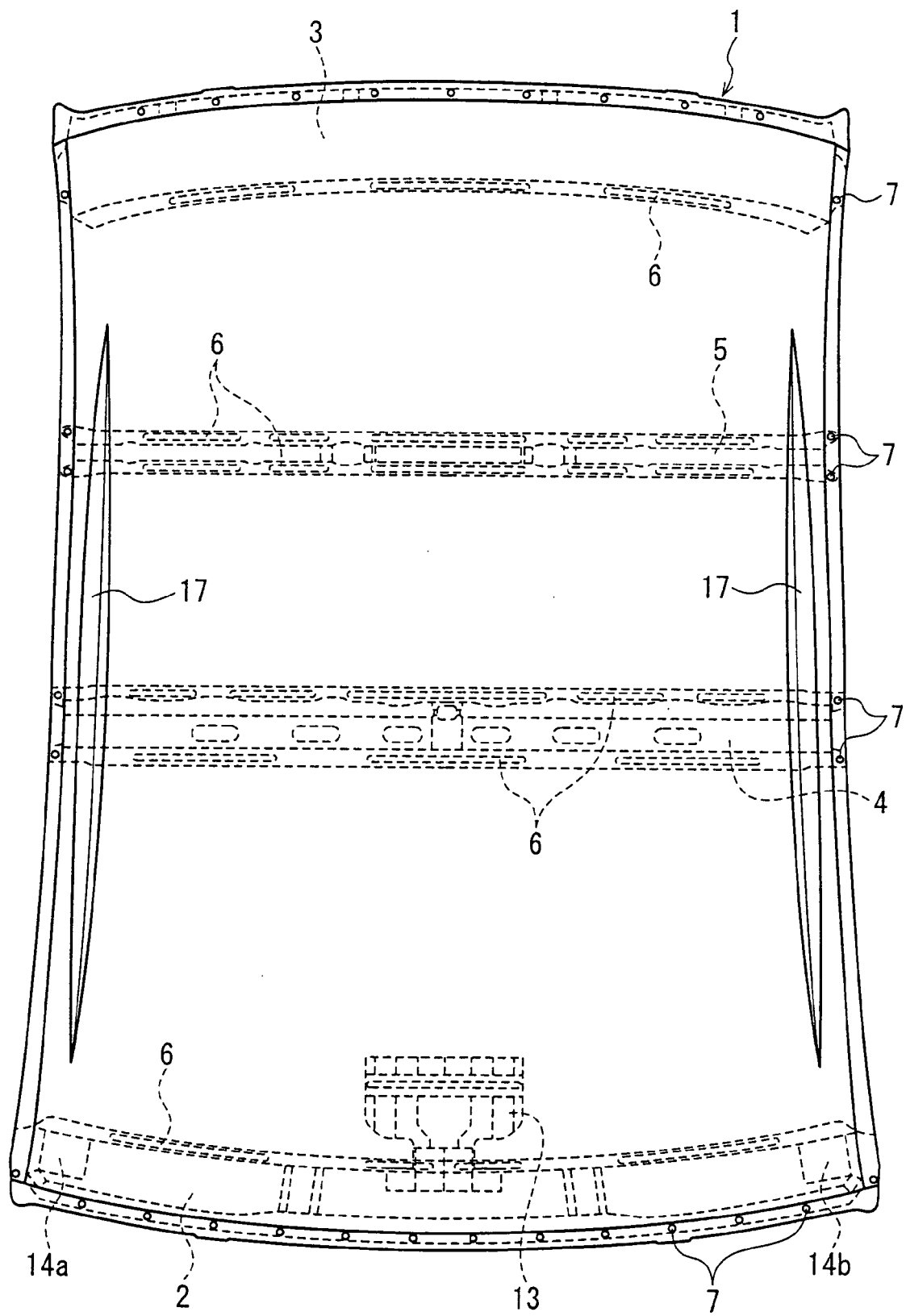
FIG. 2 is a plan view of the aluminum roof panel.
Figure 3:
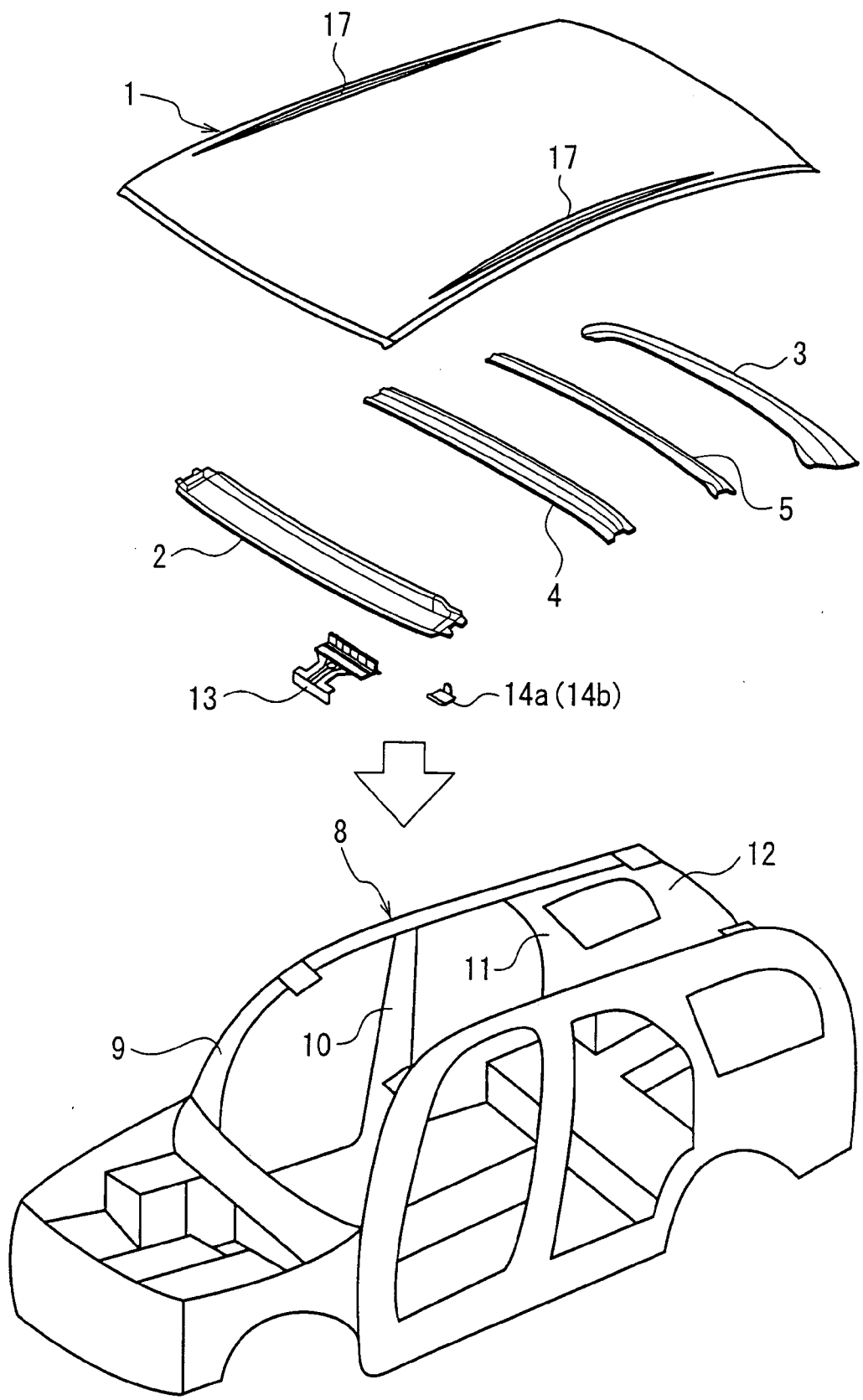
FIG. 3 is an explanation drawing showing the step of mounting the aluminum roof panel.

FIG. 1 is a sectional view of a junction between an aluminum roof panel and a side structure showing an embodiment of the present invention. FIG. 2 is a plan view of the aluminum roof panel. FIG. 3 is an explanation drawing showing the step of mounting the aluminum roof panel.

As shown in FIGS. 2 to 3, an aluminum roof panel 1, which is a structure constituting a part of a monocoque body, is subassembled to a front roof rail 2, a rear roof rail 3, a front roof bow 4, and a rear roof bow 5, each made of steel (steel plate), by mechanical joining using non-piercing rivets 7 or the like, with a sealant 6 or the like being interposed, as appropriate, between their joining surfaces. At the time of the subassembly, a map lamp bracket 13 and sun visor brackets 14a, 14b are attached to the front roof rail 2.

Then, the aluminum roof panel 1 is mounted on side structures, each made of steel (steel plate) and comprising a side roof rail 8, a front pillar 9, a center pillar 10, a rear pillar 11, and a gate pillar 12, during a main step.

During this step, the front roof rail 2 and the front pillar 9, the front roof bow 4 and the center pillar 10, the rear roof bow 5 and the rear pillar 11, and the rear roof rail 3 and the gate pillar 12 are joined together by metallurgical joining, such as spot welding or arc welding, as in the customary manner. The aluminum roof panel 1 and the side roof rail 8, on the other hand, are joined together by mechanical joining to be described later.

As shown in FIG. 1, the aluminum roof panel 1 has gutter-shaped groove portions (drip grooves) 1b formed in right and left side edge portions of a main body portion 1a of the aluminum roof panel 1, each of the groove portions 1b extending in the longitudinal direction of the vehicle body. With the bottom surface of the groove portion 1b serving as a joining surface, the aluminum roof panel 1 is joined to a joining flange portion (located on the roof side), which is formed from a side roof rail inner 8a and a side roof rail outer 8b constituting the side roof rail 8, by the non-piercing rivets 7 at a predetermined number of riveting points.

An electrically insulating structural adhesive (an epoxy resin-based adhesive or the like; for example, that disclosed in Japanese Patent Application Laid-Open No. 1993-163474 or Japanese Patent Application Laid-Open No. 1993-271640) 16 is interposed (coated) between the joining surfaces, which are the bottom surface of the groove portion 1b and the flange surface of the side roof rail outer 8b, thereby avoiding direct contact of the dissimilar metals. In the drawing, the reference numeral 20 denotes a sealing member for preventing entry of rainwater or the like between the joining surfaces.

A bead 17 of a mountain-shaped cross section, extending in the longitudinal direction along the groove portion 1b, is formed beside each of the right and left side edge portions of the main body portion 1a in the aluminum roof panel 1. A step 18 is formed over the entire region in the longitudinal direction of a vertical wall of the groove portion 1b on the side of the bead 17. Chenille 19 is filled within the groove portion 1b over the entire length of the groove portion.

In the present embodiment, as describe above, the non-piercing rivets 7 are used in joining the aluminum roof panel 1 to the side roof rail 8 which is a dissimilar metal, and the insufficient strength of the non-piercing rivets 7 is compensated for by interposing the electrically insulating structural adhesive 16 between the joining surfaces of the aluminum roof panel 1 and the side roof rail 8. Thus, a sufficient joining strength is obtained.

Furthermore, the interposition of the electrically insulating structural adhesive 16 avoids the direct contact of the dissimilar metals on the joining surfaces, thus reliably preventing stray current corrosion in cooperation with the sealing member 20. Stray current corrosion refers to metal corrosion which is caused by electrolytes (for example, rainwater) penetrating a tiny gap between the dissimilar metals. Once caused, the stray current corrosion may develop external rust on the vehicle body to spoil the beauty of the vehicle, and may also become the cause of entry of rainwater into the vehicle compartment through the corroded zone. One of the methods of preventing the occurrence of such stray current corrosion would be the interposition of an insulating sealing material between the joining surfaces (see Japanese Patent Application Laid-Open No. 2000-272541), in addition to the present embodiment. However, stress is prone to build up at the site of joining because of twisting or the like of the vehicle body. As a result, the aged deterioration of the sealing material is hastened to induce an early decline in sealing performance. This is not preferred.

At the time of the joining by use of the non-piercing rivets 7, outside plate warping takes place in the aluminum roof panel 1 with lower rigidity. This warping is effectively accommodated by the step 18.

In addition to the above-mentioned outside plate warping during joining, thermal strain due to a difference in thermal expansion may occur, at the time of baking during an electrodeposition coating step, around the side edge portions of the main body portion 1a of the aluminum roof panel 1. The thermal strain is effectively accommodated by the bead 17 disposed at the site concerned. The bead can also produce a decorative effect.

The groove portion 1b is provided along the bead 17 in the aluminum roof panel 1 (optionally, the side roof rail 8), and the aluminum roof panel 1 and the side roof rail 8 are joined by the non-piercing rivets 7 driven into the bottom surface of the groove portion 1b at the predetermined number of riveting points. Thus, the non-piercing rivets 7 can be covered by the chenille or the like filled into the groove portion 1b. This is preferred in terms of appearance.

The groove portion 1b is gutter-shaped. The gutter shape facilitates riveting and the filling with chenille, and is preferred in performing assembly work.

Moreover, the aluminum roof panel 1 is joined to the side roof rail 8 made of steel. This is preferred in replacing the materials for the purpose of weight reduction of the vehicle body.

Furthermore, the structural adhesive 16 is an epoxy resin-based adhesive. This is preferred in ameliorating the insufficient strength of riveting and in dealing with stray current corrosion due to joining of the dissimilar metals.

While the present invention has been described by the foregoing embodiment, it is to be understood that the invention is not limited thereby, but may be varied in many other ways. For example, in the above-described embodiment, the bead 17 may have a cross section in various shapes, such as an inverted mountain shape, in addition to the mountain shape. The joining means may be various means of joining, such as mechanical joining other than the use of non-piercing rivets, and joining using only an adhesive. Furthermore, the present invention can be applied to an aluminum hood, an aluminum fender, etc. in addition to the aluminum roof panel 1. Such variations are not to be regarded as a departure from the spirit and scope of the invention, and all such modifications as would be obvious to one skilled in the art are intended to be included within the scope of the appended claims.

What is claimed is:

1. A joint structure for vehicle body members, adapted to join a joining surface of a first vehicle body member, and a joining surface of a second vehicle body member, said second vehicle body member including a metal different from a metal making up said first vehicle body member, and comprising:
   a bead formed in a main body portion of said vehicle body member having lower rigidity of said first vehicle body member and said second vehicle body member, said bead being a convex portion or a concave portion having an apex shifted from a plane of the main body portion and extending along said joining surfaces.

2. The joint structure for vehicle body members according to claim 1, wherein means for joining said joining surface of said first vehicle body member and said joining surface of said second vehicle body member is mechanical joining using non-piercing rivets.

3. The joint structure for vehicle body members according to claim 1, further comprising:
   an electrically insulating structural adhesive interposed between said joining surfaces.

4. The joint structure for vehicle body members according to claim 2, further comprising:
   an electrically insulating structural adhesive interposed between said joining surfaces.

5. The joint structure for vehicle body members according to claim 1, further comprising:
   a groove portion provided along said bead in one of said first vehicle body member and said second vehicle body member; and
   non-piercing rivets, driven into a bottom surface of said groove portion at a predetermined number of riveting points, for joining said first vehicle body member and said second vehicle body member.

6. The joint structure for vehicle body members according to claim 2, further comprising:
   a groove portion provided along said bead in one of said first vehicle body member and said second vehicle body member; and
   said non-piercing rivets, driven into a bottom surface of said groove portion at a predetermined number of riveting points, for joining said first vehicle body member and said second vehicle body member.

7. The joint structure for vehicle body members according to claim 5, further comprising:
   a step formed in a vertical wall of said groove portion along said bead on a side of said bead over an entire region in a longitudinal direction.

8. The joint structure for vehicle body members according to claim 6, further comprising:
   a step formed in a vertical wall of said groove portion along said bead on a side of said bead over an entire region in a longitudinal direction.

9. The joint structure for vehicle body members according to claim 5, wherein said groove portion is gutter-shaped.

10. The joint structure for vehicle body members according to claim 6, wherein said groove portion is gutter-shaped.

11. The joint structure for vehicle body members according to claim 1, wherein one of said vehicle body members comprising said different metals is composed of aluminum, and other of said vehicle body members is composed of steel.

12. The joint structure for vehicle body members according to claim 2, wherein one of said vehicle body members comprising said different metals is composed of aluminum, and other of said vehicle body members is composed of steel.

13. The joint structure for vehicle body members according to claim 3, wherein said structural adhesive is an epoxy resin-based adhesive.

14. The joint structure for vehicle body members according to claim 4, wherein said structural adhesive is an epoxy resin-based adhesive.

15. The joint structure for vehicle body members according to claim 1, wherein the main body portion of said vehicle body member having lower rigidity is a roof panel of the vehicle.

16. The joint structure for vehicle body members according to claim 5, further comprising:
a chenille provided in the groove portion over an entire length of the groove portion.

* * * * *